Aug. 4, 1931.  H. N. OTT  1,817,642
OBJECTIVE MOUNTING FOR MICROSCOPES
Filed July 5, 1928  2 Sheets-Sheet 1
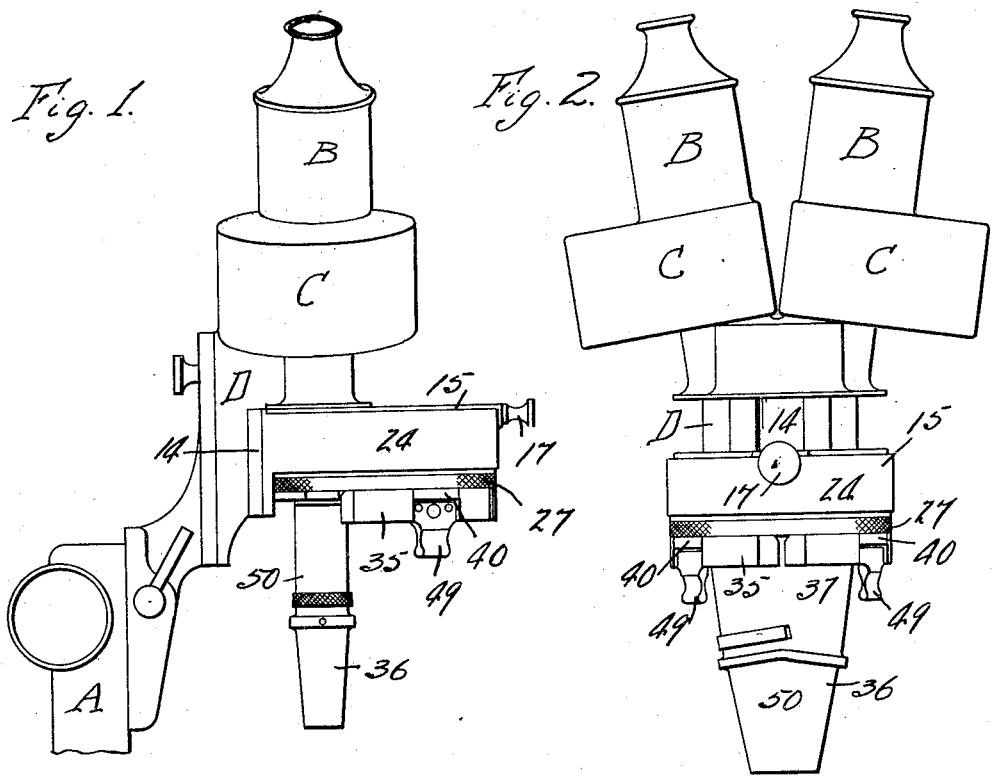
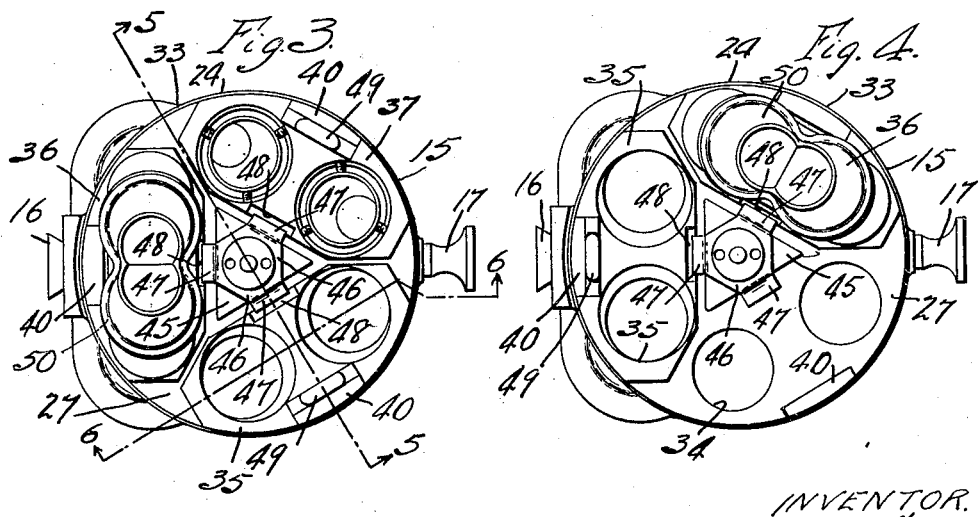
INVENTOR.
Harvey N. Ott
by Parker & Prochnow
ATTORNEYS.

Aug. 4, 1931.  H. N. OTT  1,817,642
OBJECTIVE MOUNTING FOR MICROSCOPES
Filed July 5, 1928  2 Sheets-Sheet 2
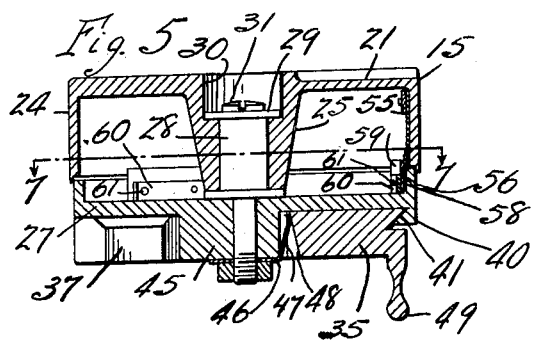
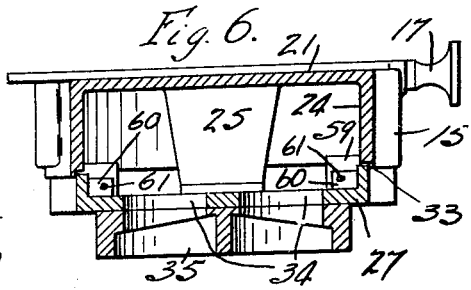
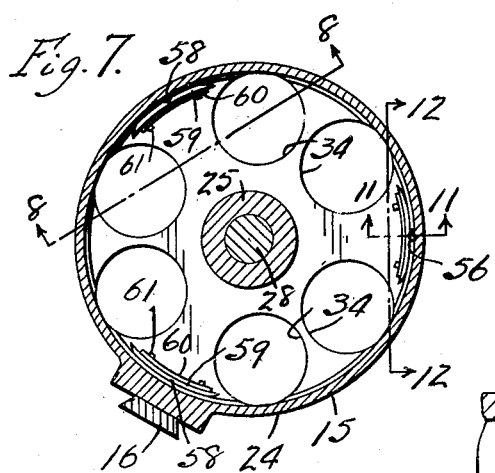
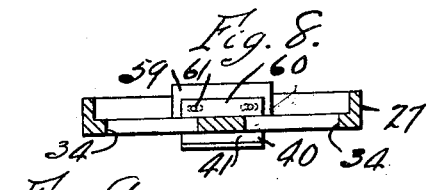
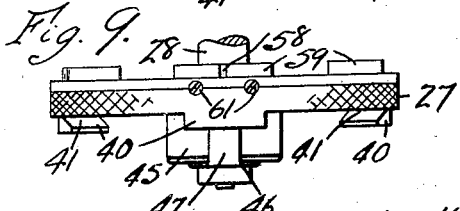
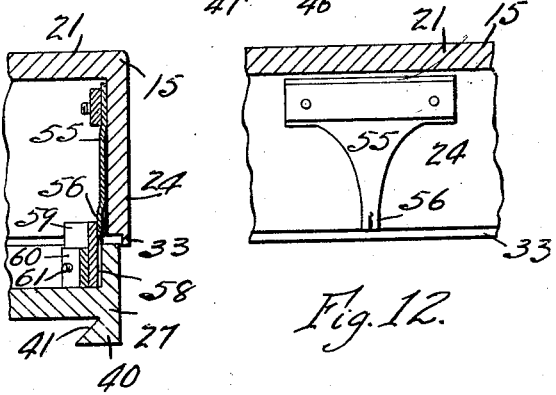
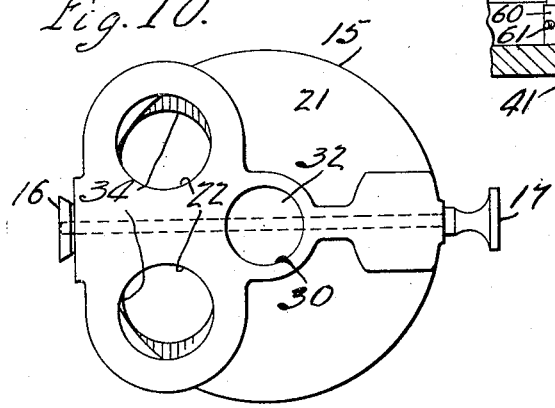
INVENTOR.
Harvey N. Ott
by Parker & Prichard
ATTORNEYS Patented Aug. 4, 1931

1,817,642

UNITED STATES PATENT OFFICE

HARVEY N. OTT, OF BUFFALO, NEW YORK, ASSIGNOR TO SPENCER LENS COMPANY, OF BUFFALO, NEW YORK

OBJECTIVE MOUNTING FOR MICROSCOPES

Application filed July 5, 1928. Serial No. 290,370.

This invention relates to improvements in objective mountings for microscopes and more particularly to the objective mountings for binocular microscopes.

The objects of this invention are to provide a binocular microscope with a series of pairs of objective lenses mounted so that any pair of the series may be quickly placed into or removed from a position in optical alinement with the body tubes of the microscope; also to provide a microscope of this kind with a rotatable support for a series of pairs of objectives, which is provided with a series of twin objectives mounted thereon and adapted to be moved into their correct positions in the optical axes of the microscope by turning the support; also to provide a microscope with an objective carrying support on which the objective holders are detachably mounted; also to provide a rotatable support for objectives which is so constructed that portions of some of the objectives may extend through apertures of the support toward the body tubes of the microscope; also to improve the construction of objective mountings for microscopes in other respects hereinafter specified.

In the accompanying drawings:

Fig. 1 is a side elevation of the upper part of a microscope embodying this invention.

Fig. 2 is a front elevation thereof.

Figs. 3 and 4 are bottom plan views of the objective mounting of the microscope, showing the objective carrier or nose piece in different operative positions.

Fig. 5 is a central sectional elevation of the objective mounting on line 5—5, Fig. 3.

Fig. 6 is a sectional elevation thereof on line 6—6, Fig. 3.

Fig. 7 is a sectional plan view thereof on line, 7—7, Fig. 5.

Fig. 8 is a sectional elevation of the rotary objective support on line 8—8, Fig. 7.

Fig. 9 is a side elevation of the rotary objective support.

Fig. 10 is a top plan view of the objective mounting.

Fig. 11 is a fragmentary sectional elevation on an enlarged scale on line 11—11, Fig. 7.

Fig. 12 is a fragmentary sectional elevation of the frame only of the objective mounting, on line 12—12, Fig. 7.

My improved objective mounting may be applied to any suitable or desired binocular microscope, that shown including the tube supporting arm A on which the body tubes of the microscope are mounted, the tubes shown including eye piece chambers B and prism chambers C. The body tubes are mounted on a slide D which is adjustable with reference to the arm A for bringing the microscope into focus with the object. The slide D is preferably provided with a channeled portion 14 to which a frame member 15 of the objective mounting embodying this invention may be secured in the usual manner, the channeled portion being preferably formed to receive a dove-tailed part 16 mounted on the frame member 15 and which may be locked in the channeled portion 14 in any suitable or usual manner, for example, by means of clamping screw 17, see Fig. 10, which is journalled in and extends crosswise of the frame member 15. This frame member has, as clearly shown in Fig. 10, a top surface 21 provided with apertures 22 through which light may pass from the objectives to the body tubes of the microscope and when the objective mounting is secured on the microscope these apertures 22 are in alignment with the lower ends of the body tubes. The frame 15 also has an annular downwardly depending flange 24 and a central boss or downwardly depending lug 25.

The objectives are carried by an objective support which is movably mounted on the frame 15 in such a manner that one or another pair of objectives may be moved at will into optical relation to the body tubes. In the particular construction shown, the objective support is in the form of a ring 27 which is pivotally mounted on the frame member 15, that shown having a central upwardly extending stud 28 which bears in the downwardly projecting lug 25 of the frame and this stud is preferably held in place by means of a washer 29, see Fig. 5, bearing on the lower end of the recess 30 in the frame member 15, the washer being held in place by means of a screw 31 engaging in a threaded hole in the end of the stud 28. The recess 30 in the frame may be closed by means of a suitable disc or cap 32 if desired. The upper edge of the ring may, if desired, extend within a downwardly extending flange 33, formed on the lower edge of the flange 24 of the frame member, to exclude dust and foreign matter from the interior of the frame member 15. Any other means for rotatably mounting the objective support or ring 27 on the frame member 15 may be provided, and the outer periphery of the ring may be knurled, if desired, to facilitate turning the same relatively to the frame member 15.

The objective support or ring 27 has a plurality of pairs of objective lenses mounted thereon in such relation to each other that the ring may be turned into different positions to place one or another pair of objectives into the optical axes of the microscope and these pairs of objectives may be rigidly secured to the objective support or ring 27 or may be removable therefrom as desired. In the construction shown, the objectives are removably mounted on the ring 27 and each pair of objectives for this purpose is mounted in a holder in which the objectives are held in correct relation to each other, so that any pair of objectives may be removed from the ring and replaced thereon without destroying the relative arrangement of the two objectives of a pair relatively to each other.

In the particular construction shown, the objective supporting ring 27 has apertures 34 arranged in pairs to permit light to pass from the objectives to the body tubes of the microscope, three such pairs of holes being shown, with which three objective holders 35, 36 and 37 are adapted to cooperate, each having a different pair of objectives mounted thereon. These holders may be removably mounted on the objective support or ring 27 in any suitable or desired manner and in the particular construction shown, the ring is provided for this purpose with a downwardly extending holding and positioning projection 40 for each holder, the inner face of each projection 40 being undercut as indicated at 41. Each objective holder is provided on its outer edge with a recess into which one of the lugs 40 may enter, the recess being of such shape that a portion of the holder enters into the undercut portion of the lug and the sides of the recess engage the sides of the lug to correctly position the holder on the objective support or ring 27.

The holders are preferably yieldingly held in their operative positions, and for this purpose the objective support or ring 27 is provided with a central downwardly projecting spring supporting post 45 which in the particular form shown is substantially triangular in shape and a spring 46 is mounted on this post having arms 47 extending along the sides of the post 45 and into positions to engage the objective holders 35, 36 and 37. Each objective holder is also provided with an inclined face 48 against which one of the spring arms 47 is adapted to press for the two-fold purpose of pressing the holder into engagement with the lug 40 and of holding the holder in engagement with the flat lower face of the objective support or ring 27. The objective holders may if desired be provided with a handle portion or projection 49 by means of which the objective holders may be easily removed from the objective support or ring.

The objective holder 36 is not provided with a holder of this kind for the reason that the downwardly extending tubular part 50 of this objective holder serves as a handle by means of which the holder may be removed from or placed on the objective support or ring.

By means of the construction described, the objective holders can be easily removed from their operative positions by grasping either the handle portion 49 of a holder or the downwardly projecting portion 50, if one is provided, and swinging the holder about its point of engagement with the lug 40 to disengage the inner inclined edge 48 of the holder from the spring 47 whereupon the holder may easily be removed from its operative position.

The holders may be provided with objective lenses of any suitable or desired kind, the structure of the frame and ring being such that some of these holders may be provided with lenses which extend upwardly through the apertures 34 in the objective support or ring and within the downwardly extending flange 24 of the support or frame, while other objective holders have lenses arranged within the upper and lower planes of the holders themselves while still other objectives may be provided with tubes 50 extending to different distances downwardly from the holders.

The objective support or ring and the supporting frame 15 are preferably provided with interengaging means for yieldingly holding the ring in its various operative positions. In the embodiment of this invention illustrated, the frame 15 is provided on the inner face of the flange 24 thereof with a spring 55, the upper end of which is suitably secured to the flange 24 of the frame and the lower end of which is bent into V-shaped cross section as shown at 56 in Figs. 11 and 12. This spring is adapted to engage with recesses or notches 58 formed in plates 59 suitably secured on the objectives support or ring 27.

When the ring is turned the spring engages one or another of the plates 59, and the plates and spring are so positioned that the V-shaped lower end 56 of the spring will enter into a recess or notch 58 of one of the plates 59 when a pair of objectives lenses are in correct relation to the body tubes of the microscope. For this purpose the plates are clamped in their operative positions by means of clamping plates 60 secured by screws or bolts 61, and the plates 59 are preferably adjustable so that they can readily be secured in their correct positions in which the objectives will be in correct optical alignment with the optical systems in the body tubes of the microscope, when the spring engages the notches or recesses of the plates 59.

The objective mounting described is thoroughly efficient in operation for the reason that the desired objective or objectives can readily be placed in position for use by turning the objective support, and by mounting the objectives on holders, any desired objective or objectives can be quickly mounted on the objectives support, and when such holders are used in connection with a binocular microscope, they have the further advantage that the two lenses of a pair can be permanently mounted in the holders in correct relation to each other. Holders of this kind may, of course, also be used to advantage in connection with monocular microscopes, since they make it possible to quickly mount any desired objective on the objective support. It will also be understood that these removable objective holders may be used on objective supports of any type.

I claim:

1. In a microscope having a body tube, an objective support mounted in operative relation to said body tube, objective holders adapted to be secured to said support, said support having a face terminating at one end thereof in an undercut downwardly extending projection, said objective holders each having a face adapted to seat against said face of the objective support and a portion adapted to seat against said projection to correctly position said objective holder on said support, said holders also being provided with downwardly and inwardly inclined faces at the sides thereof opposite to the portions thereof adapted to seat against said projections, and a spring on said objective support adapted to engage said inclined face to yieldingly urge an objective holder upwardly toward said support and into seating relation to said projections.

2. In a microscope having a body tube, the combination of an objective support arranged in operative relation to said body tube, an objective holder releasably held on said support, said support and holder having cooperating faces for seating said holders on said support, said support having an undercut projection adapted to engage a corresponding projection on said holder at one side thereof and forming a pivot about which said holder may swing into its operative position, and resilient means on said support engaging the side of the holder opposite to that about which the holder swings, said holder having a cam surface engaging with said resilient means, whereby said resilient means yieldingly holds said holder in correct position with reference to said objective support and presses said face of said holder against the corresponding face of said support.

HARVEY N. OTT.